United States Patent [19]

Bedini

[11] Patent Number: 4,498,375
[45] Date of Patent: Feb. 12, 1985

[54] AUTOMATIC COFFEE POT

[76] Inventor: Dante Bedini, 680 Knapps Hwy., Fairfield, Conn. 06430

[21] Appl. No.: 585,259

[22] Filed: Mar. 1, 1984

[51] Int. Cl.³ ............................................. A47J 31/30
[52] U.S. Cl. ....................................................... 99/303
[58] Field of Search ................. 99/307, 292, 293, 298, 99/300, 302 R, 303, 316, 317, 308, 310, 311, 312; 426/433

[56] References Cited

U.S. PATENT DOCUMENTS

| 3,368,476 | 2/1968 | Mancioli | 99/293 |
| 3,670,641 | 6/1972 | Mancioli | 99/303 |
| 4,098,176 | 7/1978 | Perez | 99/303 |

FOREIGN PATENT DOCUMENTS

| 870892 | 3/1953 | Fed. Rep. of Germany | 99/303 |
| 1176466 | 11/1958 | France | 99/303 |

Primary Examiner—Robert W. Jenkins
Attorney, Agent, or Firm—Kramer & Brufsky

[57] ABSTRACT

An automatic coffee pot which can be used interchangeably to make espresso, "American" coffee, or cappuccino within the same unit, uses a disk-shaped clamp having a plurality of filter openings therethrough seated on the coffee grounds in the interior of the filter basket to prevent the coffee from being driven by steam and boiled water generated in the pot upwardly and outwardly towards the outer diameter of the basket thereby subjecting all of the coffee beans to the steam and boiled water passing therethrough so that the beans are fully cooked or brewed and not wasted, enabling less coffee to be brewed with a given volume of water so that weaker "American" coffee can be made in the pot. A telescoping tube with a handle is provided which is disposed over a hollow longitudinal tube in an upper chamber of the pot after cream is poured into the upper chamber before or as the coffee is brewed therein and passed through the inner tube. The outer telescoping tube is provided with a vent in its side wall beneath the level of cream disposed in the upper chamber so that steam and hot water generated in the inner tube and exiting via the orifice in the side wall thereof is directed back to the bottom of the outer telescoping tube and vented through its side wall vent immersed in the liquid cream to heat and froth the same and mix the cream with the brewed coffee exiting from the inner tube to form cappuccino.

20 Claims, 8 Drawing Figures

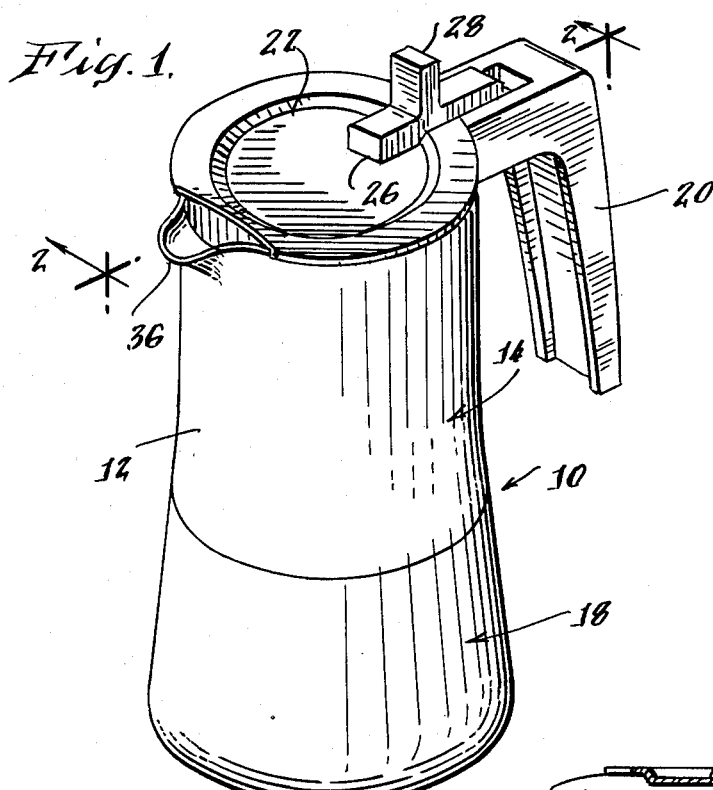
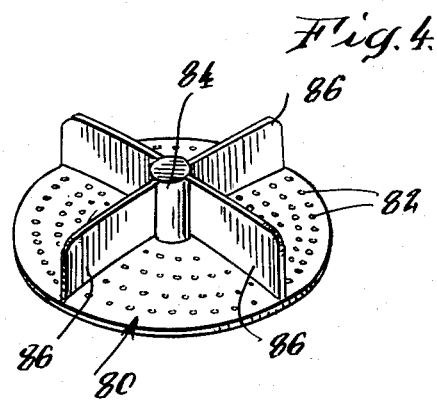
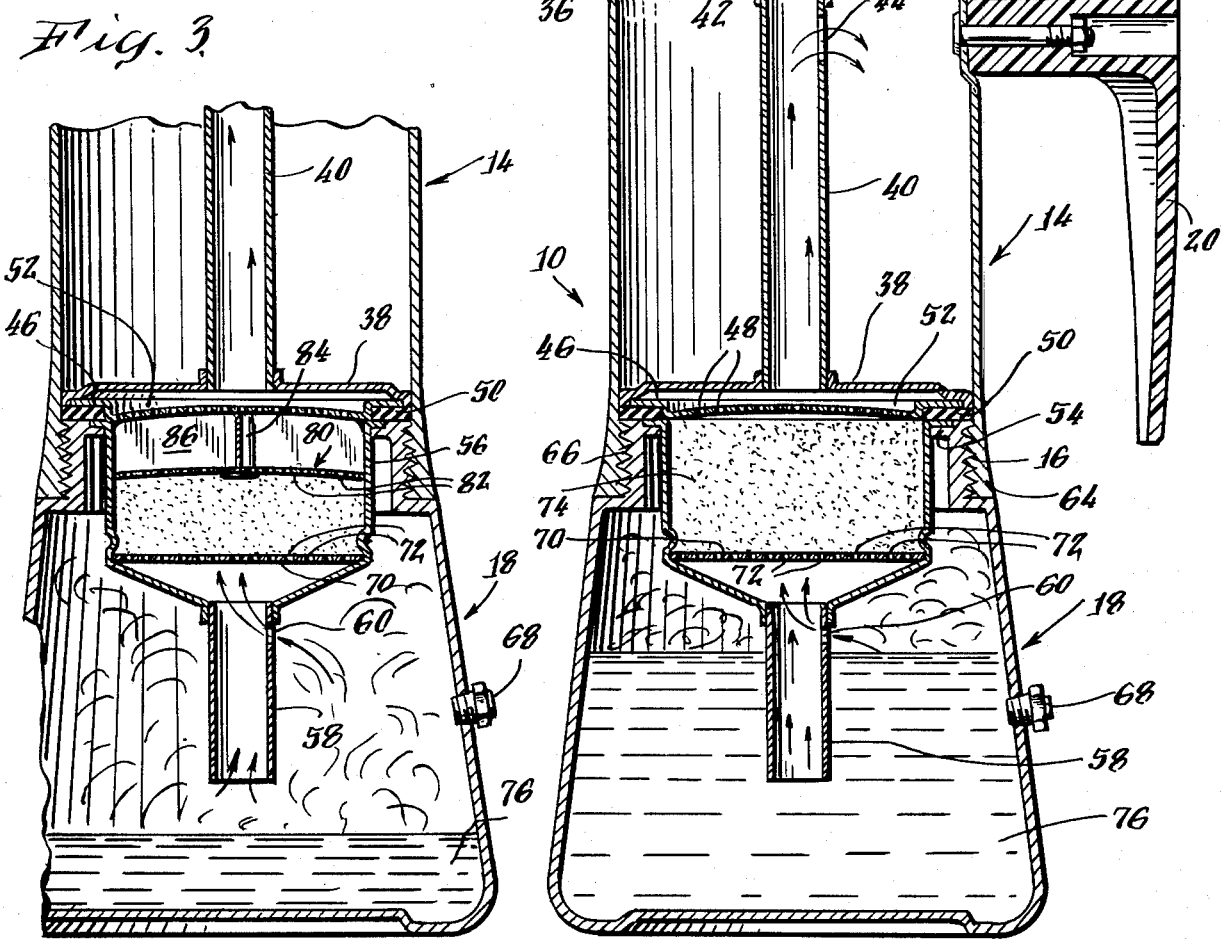

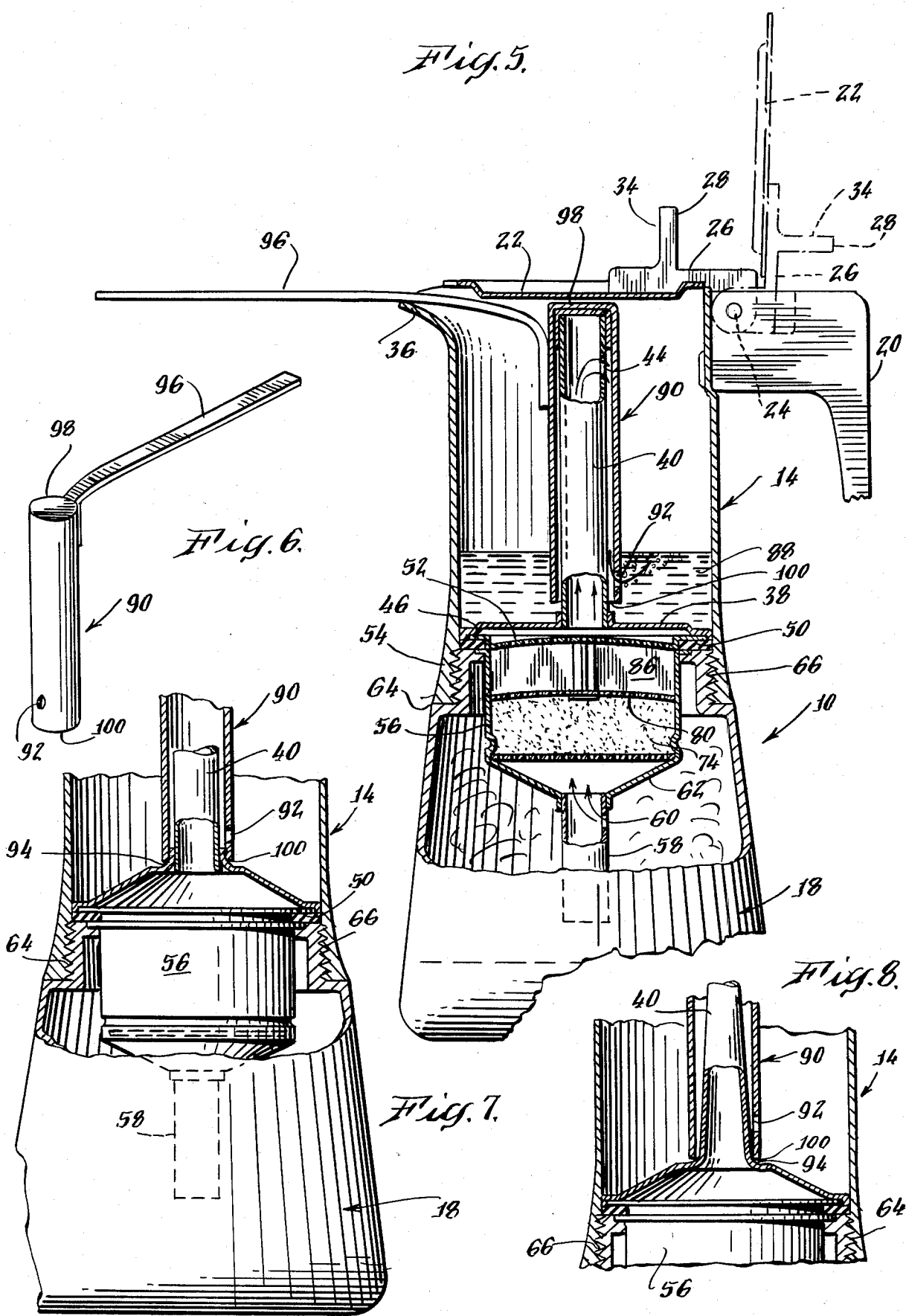

AUTOMATIC COFFEE POT

BACKGROUND OF THE INVENTION

1. Field of the Invention

This invention relates to an automatic coffee pot and more particularly, an automatic coffee pot which can be used interchangeably to make espresso, "American" coffee, or cappuccino within the same unit.

2. Description of the Prior Art

Heretofore, it was difficult to provide a single coffee pot which could be used to brew, different, although related beverages, such as espresso coffee, "American" coffee and cappuccino. In order to obtain different coffee beverages, more or less water would be required in combination with a given quantity of ground coffee beans or more or less beans would have to be used with a given amount of water disposed within the pot. If, for example, the coffee pot was designed to hold quantity of coffee beans to make three cups of espresso coffee, an attempt to make weaker or "American" coffee in the same pot would fail since a smaller volume of ground beans would have to be utilized in order to achieve the weaker brew, as the capacity to add more water would not be available, but the coffee brewing apparatus would invariably lack means to accomodate the smaller mass of ground beans seated within the pot. Steam or heated water filtered through the decreased volume of ground coffee disposed within a less than full filter basket would tend to push the coffee towards the outer diameter or one side of the filter basket housing the beans resulting in extremely weak coffee as most of the beans would not e subjected to the perking steam or hot water transmitted through the filter basket. Some means are thus necessary to apply pressure and maintain the ground coffee beans in a substantially equal distribution about the well of the filter basket in order that the steam generated and hot water sent through the ground coffee beans will contact substantially all of the beans to obtain proper flavoring and richness. This would be true even if less than full capacity of the filter basket is utilized to brew espresso coffee.

Furthermore, in order to brew cappuccino, it is necessary to add cream or milk to the liquid coffee extract and simultaneously heat the coffee extract and cream to cause a hot admixture. Prior art attempts to accomplish this objective have included a separate nozzle and chamber for heating the cream wherein steam generated in the chamber exits through the nozzle into contact with the cream as the coffee is perked or brewed in the pot, to heat the cream causing it to froth and remain in heated contact with the coffee as it is perked in the pot. This apparatus is expensive as it requires additional parts which are difficult to operate.

Accordingly, the present invention fills a need in providing a single unit which can be used to brew coffee of less capacity than the unit is designed to brew, either espresso or "American" coffee, and which can be used to prepare cappuccino.

SUMMARY OF THE INVENTION

In accordance with the invention, a coffee pot having a lower chamber is threadedly attached to a demountable and self-supporting upper chamber. Water is disposed in the lower chamber along with a filter basket utilized to hold a quantity of ground coffee beans. The filter basket is in the shape of a funnel having an elongated, longitudinally extending, cylindrical stem in communication with the water and space thereabove in the lower chamber. The lower portion of the upper chamber includes a foraminous filter plate provided with a plurality of holes which is placed in communication with the filter basket seated in the lower chamber. The space above the filter plate in the upper chamber is closed by a solid circular or conical plate, but is placed in communication with an elongated hollow tube centrally located on the solid plate. The hollow tube has an open end in communication with the space above the filter plate and an opposite closed end provided near its top with an orifice in communication with the space in the upper chamber surrounding the elongated tube.

Steam generated upon heating the water in the lower chamber is directed both upwardly through the filter basket stem and through a side vent formed in the cylindrical wall of the filter basket stem which causes a venturi effect in the stem to increase the steam and water flow through the stem while allowing ore steam to reach the coffee beans, thus resulting in more rapid heating and flooding of the coffee grounds in the filter basket. As the steam and boiling water passes through the coffee grounds in the filter basket, the essential oils and flavoring from the coffee beans will be extracted and entrapped in the steam and hot water and flow with the steam and water through the filter plate in the bottom of the upper chamber, up the hollow longitudinal tube in the upper chamber, out of the orifice near the top thereof, and the steam will condense as coffee in the upper chamber on the solid plate along with boiling coffee flavored water, surrounding the exterior wall of the longitudinal tube. The upper chamber can if desired, then be detached from the lower chamber and the coffee poured from a spout formed in the upper chamber into a cup.

If the filter basket is completely filled with coffee, as it would be if it is utilized to its full capacity, the coffee beans in the filter basket would be precluded from spreading towards the annular wall of the filter basket by clamping contact with the filter plate mounted on the lower end of the upper chamber. Normally, if the beans were not clamped in the filter basket, steam and boiling water would flow through the central longitudinal stem of the funicular filter basket to the central longitudinal tube in the upper chamber through a path of least resistance or directly through the center of the filter basket, pushing the coffee grounds up and outwardly towards the wall of the filter basket. Thus, if less than the full volume of the filter basket is utilized, as for example, in preparing a weaker brew of "American-style" coffee utilizing the same volume of water in the lower chamber, a disk-shaped clamp having a plurality of filter openings therethrough is provided and seated on the coffee grounds in the interior of the filter basket. This prevents the coffee being driven by the steam upwardly and outwardly towards the outer diameter of the basket and subjects all of the coffee beans to the steam and boiling water passing and permeating therethrough so that the beans are fully cooked or brewed and not wasted.

The coffee pot apparatus of the present invention can also be used to make cappuccino by providing a portable telescoping tube with a handle which is disposed over the hollow longitudinal tube in the upper chamber after cream is poured into the upper chamber before or as the coffee is brewed therein. The outer telescoping tube is provided with a vent in its side wall beneath the level of cream disposed in the upper chamber so that steam generated in the inner tube and exiting via the orifice in the side wall thereof is directed back to the bottom of the outer telescoping tube and vented through its side wall vent immersed in the liquid cream to heat and froth the same and mix the cream with the brewed coffee exiting from the orifice in the inner stem or tube. The handle attached to the telescoping tube extends through the spout on the upper chamber and enables the cappuccino tube to be removed or positioned on the inner tube as desired. The outer tube should be removed while the pot is still on the heat source boiling the water in the cover chamber or the tube will act as a conduit to draw the heat back from the liquid in the upper chamber to the water in the lower chamber.

BRIEF DESCRIPTION OF DRAWINGS

Further objects and advantages of the invention will become more apparent from the following description and claims and from the accompanying drawings, wherein:

FIG. 1 is a perspective view of the improved automatic coffee pot of the present invention;

FIG. 2 is a longitudinal cross-sectional view taken substantially along the plane indicated by line 2—2 of FIG. 1;

FIG. 3 is a view similar to FIG. 2 but illustrating the utilization of a clamping disk in the filter basket of the coffee pot of the present invention to assure complete brewing of the ground coffee beans disposed within the filter basket when a weaker brew is desired;

FIG. 4 is a perspective view of the clamping disk utilized with the filter basket of the improved automatic coffee pot of the present invention;

FIG. 5 is a view similar to FIG. 3 but illustrating the utilization of an auxiliary tube placed in the upper chamber of the improved coffee pot to form cappuccino;

FIG. 6 is a perspective view of the auxiliary tube used to brew cappuccino;

FIG. 7 is a view similar to FIG. 5 but illustrating another embodiment of a solid base for the upper chamber of the improved automatic coffee pot of the present invention; and FIG. 8 is a view of the juncture of an alternative form of hollow tube which can be used in the upper chamber of the coffee pot in combination with the auxiliary cappuccino tube of the present invention.

DETAILED DESCRIPTION OF THE PREFERRED EMBODIMENT

Referring now to the drawings in detail, wherein like numerals indicate like elements throughout the several views, the improved automatic coffee pot of the present invention is designated by the numeral 10.

The coffee pot 10 includes a two-part housing 12 consisting of an upper chamber 14 threadably connected at 16 to a lower chamber 18. The upper chamber 14 includes a plastic carrying handle 20 and a cover 22 pivotably connected to the handle 20 by pivot pin 24.

The cover 22 is integrally connected to a plastic attachment 26 having an upstanding lug 28 for contact with the thumb of the user. The rear portion of the attachment 26 includes a downwardly extending lug 30 which receives the pivot pin 24 therethrough, which in turn is embedded in the surrounding side walls defining a cavity 32 in the handle 20 which receives the downwardly extending lug 30 on the attachment 26. Upon pressure being applied to the front surface 34 of upstanding lug 28, the downwardly extending lug 30 received within cavity 32 on handle 20 will pivot in a clockwise manner as viewed in FIGS. 2 and 5 about the axis of pivot pin 24, the raise the cover lid 22.

The top of the annular wall of upper chamber 14 is provided with a pouring spout 36 which is in communication with the interior of chamber 14 and is not covered by lid 22 so that the contents of the interior of chamber 14 may be dispensed through spout 36 even with the lid or cover 22 in the closed position shown in FIGS. 1 and 2 covering a substantial portion of the top of chamber 14.

The bottom of chamber 14 is closed by a solid, substantially circular plate 38. Extending longitudinally upwardly through the center of plate 38 is a hollow tubular member 40 which is open at its lower end and is provided with a removable cap 42 at its upper end. Tube 40 has an orifice 44 formed in its annular wall adjacent the top of the tube 40 but below cap 42. The interior of chamber 14 communicates with the interior of tube 40 through orifice 44.

A foraminous saucer-shaped filter plate 46 having a plurality of small holes or openings 48 is clamped by an annular rubber washer or seal 50 against the rim of the solid bottom circular plate 38 closing chamber 14 and is spaced from the remainder of the circular plate 38 so as to form a chamber 52 in communcation with the interior of the hollow longitudinal tube 40 through the open lower end of tube 40.

The lower chamber 18 includes an annular lip 54 defining a seat for an annular flange on a cylindrical filter basket 56 adapted to receive ground coffee beans. The filter basket 56 includes an elongated stem 58 having a lateral opening, vent, or orifice 60 in its cylindrical wall adjacent the juncture of the stem and bottom of the filter basket. Stem 58 is connected to filter basket 56 by a conical plate 62 rendering the filter basket funicular in shape.

The top portion of the outer wall of lower chamber 18 is threaded at 64 so as to mate with corresponding threads 66 on the lower portion of the upper chamber 14. A safety steam vent 68 is provided in communication with the interior of lower chamber 18 to complete the construction of the lower chamber. Stem 58, at its lower end is in communication with the space in the lower chamber 18 and terminates at its upper end beneath a filter plate 70 including a plurality of small openings 72 seated in the interior of the filter basket 56.

Normally, the entire upper cylindrical portion of filter basket 56 between plate 70 and filter disk 46 would be filled with ground coffee beans 74. The interior of the lower chamber 18 is filled with water 76 to a level encompassing and surrounding stem 58 just below the opening 60 in the annular wall of the top of stem 58. The pot 10 would then be placed on a source of heat such as a gas flame or electric heating coil of a stove which would heat the water 76, generating steam above the level of the water in chamber 18 exerting pressure on the water 76 and causing the water to continuously boil. As the water boils, steam will be generated in the interior of stem 58 above the level of water 76 in the chamber 18. Steam will also be generated above the water level and enter the interior of the stem 58 through opening 60 forming a draft and a venturi at the top of the stem, also increasing the flow of steam and boiling water through the stem while bringing more steam quickly to impinge upon the plate 70 in the filter basket 56 through opening 60. As steam is generated against plate 70 it, along with boiling water pushed up through the stem 58 by the vapor pressure generated above the level of the water 76, will flow through the openings 72 in the plate and through the coffee grounds 74 held captive in the basket 56 by being clamped against the bottom of the saucer-shaped filter plate 46. The steam and boiling water will be admixed with essential oils released by the heated coffee grounds and coffee flavored steam and water will enter through openings 48 in the saucer-shaped filter plate 46 into chamber 52, and the interior of tube 40 in the upper chamber 14. The steam and boiled water will ultimately be pushed up and rise in tube 40 and discharged through orifice 44 into the interior of chamber 14 onto impervious circular plate 38 and the steam will condense and mix with the boiled coffe flavored water within chamber 14 to form liquid coffee. After all of the water 76 in the lower chamber 18 has been boiled and sent through the coffee beans 74 into the upper chamber 14, the upper chamber 14 may be unthreaded from the lower chamber 18, if desired, and the coffee poured and dispensed through spout 76 into a cup for consumption.

In the event that it is desired to make less coffee than the capacity of the pot 10 is designed for, or it is desired to make a weaker brew utilizing the maximum water capacity, as for example when utilizing the pot to make "American-style" coffee rather than espresso, it is necessary that the amount of coffee beans 74 deposited within the filter basket 56 not fill the entire basket. The steam and boiled water which is generated upon boiling of the water 76 within the lower chamber upon migration through the coffee 74 in basket 56 would tend to move in the path of least resistance or in a straight line from the interior of stem 58 to the interior of chamber 40 via chamber 52 pushing the coffee beans 74 upwards and towards the annular wall of the filter basket 56, not permeating the entire volume of coffee disposed within the filter basket 46, thus resulting in an extremely weak brew. Therefore, it has been found to be advantageous to supply an auxiliary disk 80 in filter basket 56 on top of the coffee when using a lesser volume than would normally fill the basket 56.

The disk 80 has a diameter which approximates the interior diameter of the filter basket 56 and is also provided with a plurality of filter openings 82 and a central lug 84 which can serve as a hub for a plurality of radial vanes 86 seated on the top surface of disk 80. Conveniently, the height of the lug 84 and radial vanes 86 would approximate the height of the unused space within the interior of the filter basket 56 (e.g., when the volume of the coffee beans 74 would be sufficient for "American-style" coffee using the same water capacity as if the pot were used to brew expresso) so that a clamping force will be exerted thereon and on the disk 80 by saucer-shaped filter plate 46 which would be transmitted to the coffee grounds 74 by virtue of contact with the bottom of saucer-shaped filter plate 46 in the upper chamber 14. This would preclude the grounds 74 from moving up and away from the center of the disk 70 towards the outer wall of the filter basket as the steam and boiled water permeates therethrough.

Nevertheless, the hub 84 and vanes 86 will rise slightly with the coffee grounds if the hub 84 is not in contact with the filter plate 46 until it contacts the plate and will not only prevent canting of the disk 80 but will clamp the coffee beans 74 against the lower disk 70 in basket 56. Even if contact is not made with the bottom of the saucer-shaped filter plate 46, the vanes and hub provide sufficient weight on the coffee beans 74 to preclude substantial movement thereof within the filter basket 56 as steam and boiled water is sent therethrough.

In order to utilize the improved automatic coffee pot 10 to brew cappucino, it is only necessary to raise the lid 22 as indicated in FIG. 5 and pour a quantity of milk or cream 88 into the upper chamber 14 which will admix with the normally brewed coffee exiting from the tube 40 through the orifice 44. To ensure that the cream 88 mixes with the brewed coffee in chamber 14 and the combined beverage is heated and frothed, an auxiliary tube 90 having an elongated handle 96 secured to the annular side wall thereof adjacent the top of the tube is provided. The tube 90 is closed at one end adjacent to the handle 96 but is opened at its opposite end 100 and is of a slightly greater diameter than the external diameter of the tube 40 so that it can be slidingly received thereover in telescoping relationship.

As shown in FIG. 5, in use, the inverted auxiliary tubular member 90 is telescopically slid over the tube 40. The handle 96 extends outwardly from the longitudinal axis of tubular member 96 and rests upon the spout 36. The lid 22 is closed so as to retain the heat within the upper chamber 14. Brewed coffee exiting through orifice 44 in tube 40 entrained with the steam generated in the lower chamber 18 will flow between the outer diameter of the tube 40 and the inner diameter of the auxiliary tube 90 and exit through an orifice or steam vent 92 formed in the side wall of the outer tube 90 and from the open bottom 100 of the tube 90. Both the bottom of tube 90 and steam vent 92 are disposed beneath the level of cream 88 provided in the upper chamber 14 to that the steam and entrained coffee will be heatedly mixed in the upper chamber 14 and frothed to form cappuccino. Before the pot 10 is removed from its heat source, tube 90 is grasped by handle 96 and removed from the pot or it has been found, that the heat in the creamed beverage will be transmitted back up the tube 90 and down tube 40 back into the lower chamber 18. Once all the coffee has been brewed and no further steam or hot water is generated in the lower chamber 18 and the outer tube 90 removed by lifting of handle 96, the lower chamber 18 can be unthreaded from the upper chamber 14 if desired, and the cappuccino in the upper chamber 14 served in separate cups by pouring the same from the upper chamber 14 through spout 36.

As shown in FIG. 7, the base plate 38 of the upper chamber 14 can be conical in shape terminating in an annular flange 94 which can serve as a seat for the bottom end 100 of tubular member 90. This assures that all of the brewed coffee and steam will exit through steam vent 92 rather than vent 92 and the bottom 100 of the tube 90. It has been found that if all the steam and brewed coffee is directed through vent 92, the cream 88 is heated much more rapidly and frothed to a much more visible extent.

Similarly, as shown in FIG. 8, the inner tube 40 can be conical in shape wherein the outer tube 90 will seat on the lower end of the inner tube 40 so that all of the steam and brewed coffee exits through vent 92 into chamber 14.

What is claimed as new is as follows:
1. A coffee pot comprising:
an upper chamber releasably connected to a lower chamber, said lower chamber having
a filter basket disposed therein adapted to receive a quantity of ground coffee beans, said filter basket having
a hollow stem portion in communication with said lower chamber and adapted to receive steam generated by heating of water in said lower chamber which is directed through said filter basket and ground coffee beans,
a filter plate between said upper and lower chambers in communication with the interior of said filter basket housing said ground coffee beans,
a solid plate forming a liquid holding bottom for said upper chamber provided in said upper chamber in spaced relation above said filter plate,
an elongated tubular member seated on said solid plate and having one end provided with an opening in communication with the space between said filter plate and said solid plate, the other end of said elongated tubular member being closed, and
an orifice formed in the side wall of said elongated tubular member providing communication along with said opening in said one end between the interior of said upper chamber and the space between said solid plate and said filter plate,
a lid pivotally mounted on said upper chamber for substantially closing said upper chamber, and
means on said filter basket stem portion disposed in said lower chamber providing communication between the interior of said filter basket and said lower chamber for increasing the flow of steam generated upon heating of water in said lower chamber through said stem and filter basket.

2. The coffee pot of claim 1 including means disposed within said filter basket for clamping ground coffee beans disposed therein to preclude substantial movement thereof when subjected to steam flowing therethrough.

3. The coffee pot of claim 2 wherein said clamping means includes a circular foraminous disk adapted be disposed within said filter basket.

4. The coffee pot of claim 3 wherein said circular foraminous disk includes a central hub portion.

5. The coffee pot of claim 4 wherein a plurality of radially extending vanes are connected to said hub and seated on the upper surface of said foraminous disk.

6. The coffee pot of claim 1 including means adapted to be received on the elongated tubular member in said upper chamber for directing steam and brewed coffee to the bottom of said upper chamber as it issues from the orifice in the side wall thereof.

7. The coffee pot of claim 6 wherein
said directing means includes
a tube provided with a handle ajacent to the top thereof, said tube including a closed end and an open end telescopically received over said elongated tubular member in the upper chamber of said coffee pot.

8. The coffee pot of claim 7 including
a vent in the side wall of said outer tube adjacent the open end thereof.

9. The coffee pot of claim 8 wherein the solid disk forming the bottom of the upper chamber of said coffee pot includes
a sloping upper surface adapted to matingly engage with the lower surface of said outer tube.

10. The coffee pot of claim 8 wherein said inner elongated tubular member is conical in shape and includes a lower portion having at least a diameter equal to the inner diameter of said outer tube.

11. The coffee pot of claim 1 wherein said flow increasing means includes a vent formed in the wall of the stem portion of said filter basket.

12. The coffee pot of claim 1 wherein said upper chamber is threadedly connected to said lower chamber.

13. A coffee pot comprising:
an upper chamber releasably connected to a lower chamber,
said lower chamber having
a filter basket disposed therein adapted to receive a quantity of ground coffee beans, said filter basket having
a hollow stem portion in communication with said lower chamber and adapted to receive steam generated by heating of water in said lower chamber which is directed through said filter basket and ground coffee beans,
a filter plate between said upper and lower chambers in communication with the interior of said filter basket housing said ground coffee beans,
a solid plate forming a liquid holding bottom for said upper chamber provided in said upper chamber in spaced relation above said filter plate,
an elongated tubular member seated on said solid plate and having one end provided with an opening in communication with the space between said filter plate and said solid plate, the other end of said elongated tubular member being closed,
an orifice formed in the side wall of said elongated tubular member providing communication along with said opening in said one end between the interior of said upper chamber and the space between said solid plate and said filter plate,
a lid pivotally mounted on said upper chamber for substantially closing said upper chamber, and
means disposed within said filter basket for clamping ground coffee beans disposed therein to preclude substantial movement thereof when subjected to steam flowing therethrough.

14. The coffee pot of claim 13 wherein said clamping means includes a circular foraminous disk adapted be disposed within said filter basket.

15. The coffee pot of claim 14 wherein said circular foraminous disk includes a central hub portion.

16. The coffee pot of claim 15 wherein a plurality of radially extending vanes are connected to said hub portion and seated on the upper surface of said foraminous disk.

17. A coffee pot comprising:
an upper chamber releasably connected to a lower chamber,
said lower chamber having
a filter basket disposed therein adapted to receive a quantity of ground coffee beans, said filter basket having
a hollow stem portion in communication with said lower chamber and adapted to receive steam generated by heating of water in said lower chamber which is directed through said filter basket and ground coffee beans,
a filter plate between said upper and lower chambers in communication with the interior of said filter basket housing said ground coffee beans, a solid plate forming a liquid holding bottom for said upper chamber provided in said upper chamber in spaced relation above said filter plate, an elongated tubular member seated on said solid plate and having one end provided with an opening in communication with the space between said filter plate and said solid plate, the other end of said elongated tubular member being closed, an orifice formed in the side wall of said elongated tubular member providing communication along with said opening in said one end between the interior of said upper chamber and the space between said solid plate in said filter plate, a lid pivotally mounted on said upper chamber for substantially closing said upper chamber, and means adapted to be received on the elongated tubular member in said upper chamber for directing steam and brewed coffee to the bottom of said upper chamber as it issues from the orifice in the side wall thereof.

18. The coffee pot of claim 17 wherein
said directing means includes
a tube provided with a handle ajacent to the top thereof, said tube including a closed end and an open end telescopically received over said elongated tubular member in the upper chamber of said coffee pot.

19. The coffee pot of claim 18 including
a vent in the side wall of said outer tube adjacent the open end thereof.

20. The coffee pot of claim 17 including means disposed within said filter basket for clamping ground coffee beans disposed therein to preclude substantial movement thereof when subjected to steam flowing therethrough.

* * * * *